United States Patent [19]

Azuma et al.

[11] 4,196,279

[45] Apr. 1, 1980

[54] PROCESS FOR PRODUCING POLYESTERS HAVING A HIGH DEGREE OF POLYMERIZATION

[75] Inventors: Shizuo Azuma; Noritsugu Saiki; Shoji Kawase, all of Iwakuni, Japan

[73] Assignee: Teijin Limited, Osaka, Japan

[21] Appl. No.: 923,585

[22] Filed: Jul. 11, 1978

[30] Foreign Application Priority Data

Jul. 19, 1977 [JP] Japan .................................. 52-85634
Nov. 9, 1977 [JP] Japan ................................ 52-133582
Jan. 30, 1978 [JP] Japan .................................. 53-8234

[51] Int. Cl.² ...................... C08G 63/06; C08G 63/18
[52] U.S. Cl. ............................... 528/275; 260/45.7 R; 260/45.75 C; 528/488; 528/491
[58] Field of Search .............. 528/273, 274, 275, 488, 528/491; 260/45.75 R, 45.7 C

[56] References Cited

U.S. PATENT DOCUMENTS

| | | | |
|---|---|---|---|
| 3,328,355 | 6/1967 | Dawes et al. ..................... | 528/274 X |
| 3,391,123 | 7/1968 | Steadly ................................. | 528/273 |
| 3,530,098 | 9/1970 | Schweizer ....................... | 528/275 X |
| 3,644,217 | 2/1972 | Cyba .............................. | 260/45.7 R X |
| 3,904,707 | 9/1975 | Gebhart et al. ............. | 260/45.7 R X |
| 4,116,931 | 9/1978 | Minhas et al. ............... | 260/45.7 R X |

Primary Examiner—Lucille M. Phynes
Attorney, Agent, or Firm—Sherman & Shalloway

[57] ABSTRACT

An improved process for producing a linear polyester having a high degree of polymerization which comprises first preparing a prepolymer of polyester and then polycondensing the prepolymer. In the first step, a prepolymer having an intrinsic viscosity of at least 0.2 is prepared, and the subsequent polycondensation is carried out in the presence of an organic boron compound of the formula

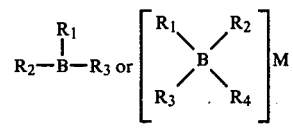

wherein $R_1$, $R_2$, $R_3$ and $R_4$ represent an alkyl, aralkyl or aryl group having 6 to 20 carbon atoms, and M represents a monovalent metal. According to this method, the polycondensation can be performed at atmospheric pressure, and a substantially linear polyester having an intrinsic viscosity of at least 0.5 and superior thermal stability can be obtained rapidly.

5 Claims, No Drawings

PROCESS FOR PRODUCING POLYESTERS HAVING A HIGH DEGREE OF POLYMERIZATION

This invention relates to a process for producing substantially linear polyesters having a high degree of polymerization and superior thermal stability. More specifically, the invention relates to a process for producing substantially linear polyesters having a high degree of polymerization and superior thermal stability which comprises melt-polymerizing a glycol ester of a dicarboxylic or hydroxycarboxylic acid or an oligomer of the ester, characterized in that when the degree of polymerization of the polymer in the polymerization stage reaches a value corresponding to an intrinsic viscosity (calculated from the viscosity of a solution of the polymer in o-chlorophenol which is measured at 35° C.) of at least 0.2, at least one specified organic boron compound containing no boron-oxygen bond is added, and then the melt-polymerization is continued.

It is well known in the art that fiber-forming or film-forming polyesters are prepared by reacting a dicarboxylic acid or its ester-forming derivative with a glycol or its ester-forming derivative.

The dicarboxylic acid includes, for example, aliphatic dicarboxylic acids having 2 to 20 carbon atoms, such as oxalic acid, succinic acid, adipic acid, sebacic acid, decanedicarboxylic acid and dodecanedicarboxylic acid, and aromatic dicarboxylic acids such as terephthalic acid, isophthalic acid, diphenyl-4,4'-dicarboxylic acid, naphthalene-2,6-dicarboxylic acid, naphthalene-2,7-dicarboxylic acid, naphthalene-1,4-dicarboxylic acid, naphthalene-1,5-dicarboxylic acid, diphenylether-4,4'-dicarboxylic acid, diphenylsulfone-4,4'-dicarboxylic acid, diphenylmethane-4,4'-dicarboxylic acid and diphenoxyethane-4,4'-dicarboxylic acid.

Examples of the ester-forming derivatives of such dicarboxylic acids are their lower aliphatic esters such as methyl, ethyl and n-propyl esters, their aryl esters such as phenyl esters, and their acid chlorides.

The glycol includes aliphatic and alicyclic dihydric alcohols having hydroxyl groups bonded to two adjacent carbon atoms, namely 1,2-glycols such as ethylene glycol, propylene glycol, butane-1,2-diol, cyclohexane-1,2-diol and cyclopentane-1,2-diol; aliphatic and alicyclic dihydric alcohols which have alcoholic hydroxyl groups in the 1- and 3-positions, namely 1,3-glycols such as trimethylene glycol, neopentylene glycol, butane-1,3-diol, and cyclohexane-1,3-diol; and other glycols such as tetramethylene glycol, hexamethylene glycol, decamethylene glycol, cyclohexane-1,4-dimethanol, and p-xylene glycol. These glycols may be used singly or as mixtures. The 1,2-glycols may be used in the form of reactive ester-forming derivatives such as carbonic acid esters and anhydrides.

Preparation of polyesters from these dicarboxylic acids or ester-forming derivatives thereof and these glycols or ester-forming derivatives thereof can be accomplished by a two-stage method comprising a first step of forming a diglycol ester of a dicarboxylic acid or a precondensate thereof by a direct esterification reaction between the dicarboxylic acid and glycol, an ester-interchange reaction between an ester-forming derivative of the dicarboxylic acid, such as a lower alkyl or phenyl ester of the dicarboxylic acid, and the glycol, or by a reaction between the dicarboxylic acid and an ester-forming derivative of the glycol such as an alkylene oxide; and a second step of forming a polymer by heating the diglycol ester of the dicarboxylic acid or its precondensate at reduced pressure and/or in an inert gas current to perform the polycondensation while expelling the glycol.

A method for preparing polyesters has also been known which comprises reacting a hydroxycarboxylic acid such as omega-hydroxycaproic acid, p-hydroxybenzoic acid, p-(β-hydroxyethoxy)benzoic acid, p-4-(β-hydroxy-ethoxy)phenylbenzoic acid and β-hydroxyethoxyvanillic acid, or an ester-forming derivative of the hydroxycarboxylic acid such as a lower aliphatic or phenyl ester, with the aforesaid glycol or its ester-forming derivative to form a glycol ester of the hydroxycarboxylic acid or a precondensate thereof (first step), and polycondensing it to form a substantially linear, fiber-forming or film-forming polyester (second step).

The first-stage reaction of forming a glycol ester of the dicarboxylic or hydroxycarboxylic acid or a precondensate thereof may be carried out in the absence of a catalyst between the dicarboxylic acid or its ester-forming derivative or the hydroxycarboxylic acid or its ester-forming derivative and the glycol or its ester-forming derivative, but the reaction proceeds more smoothly in the presence of an esterification catalyst or an ester-interchange catalyst. Many catalysts have been known to be usable in such a reaction.

The glycol ester of the dicarboxylic or hydroxycarboxylic acid or its precondensate is subsequently polycondensed with removal of the glycol (second-stage reaction). In the second-stage reaction, the glycol ester of the dicarboxylic or hydroxycarboxylic acid or its precondensate is polycondensed. In each case, splitting-off of the glycol always accompanies this polycondensation reaction. Although the polycondensation reaction can be carried out in the absence of a catalyst, the rate of reaction is extremely low. Accordingly, it is the usual practice to increase the rate of reaction by using a catalyst such as antimony trioxide, antimony acetate, antimony trifluoride, antimony glycolate, tetrabutyl titanate, tetrapropyl titanate, potassium ethyl titanate $[K_2Ti(OC_2H_5)_6]$, germanium dioxide, tetrabutyl germanate $[Ge(OC_4H_9)_4]$, zinc acetate, lead oxide and manganese acetate. Even with the use of these catalysts, however, long periods of time are required to complete the polycondensation reaction, and the reaction must be carried out at temperatures of as high as 200° to 350° C. This necessarily leads to the thermal decomposition of the polycondensation catalyst, and consequently causes an increase in the amount of free carboxyl groups and gives polyesters having poor heat stability. For instance, in the commercial production of polyethylene terephthalate, it is the practice to carry out the reaction at high temperatures of, say, about 270° to 310° C. under a high vacuum of about 0.1 mmHg for about 1 to 10 hours. Moreover, large equipment is required to maintain the output of the polymer at a certain level. This prior technique further has the disadvantage that since the reactants are exposed to high temperatures for a long period of time and thermal decomposition occurs as the polycondensation reaction proceeds, it is considerably difficult to reduce the content of free carboxyl groups (terminal carboxyl groups) below a certain level and to obtain a polymer having a degree of polymerization exceeding a certain level.

It is also known that such a polyester as described above has better break and impact strengths as its degree of polymerization is higher because these properties depend mainly on the degree of polymerization. Thus, attempts have been made to produce linear polyesters having a high degree of polymerization and a low terminal carboxyl group content by using additives other than the polymerization catalyst in the polycondensation reaction (second-stage reaction) described above. For example, Shima et al. disclose that a diaryl ester of a dicarboxylic acid or a carbonate derivative of a monohydric phenol is added to the polymerization system at a stage when the intrinsic viscosity of the polymer reaches at least 0.35, or at least 0.2, and the polymerization reaction is continued under reduced pressure (U.S. Pat. Nos. 3,433,770 and 3,444,141). These methods serve to promote the polymerization reaction by increasing the rate at which the free glycol is discharged out of the system from the molten polymer so that a polyester of a high degree of polymerization may be obtained. Preferably, the removal of the free glycol out of the system should be performed under reduced pressure. The result is not satisfactory when the method is operated at atmospheric pressure.

A method for preparing fibers of ethylene terephthalate polyester having a low molecular weight sufficient to reduce pilling is also known which comprises melt-polymerizing ethylene terephthalate in the presence of an ordinary polycondensation catalyst to a final temperature of about 250° to 300° C. and a final pressure of less than about 10 mmHg, and melt-spinning the resulting ethylene terephthalate polyester, wherein an oxyboron compound is added to the ethylene terephthalate polyester prior to melt-spinning to increase the melt viscosity of the polyethylene terephthalate, the polymer is then melt-spun, and the resulting fibers are exposed to moisture (U.S. Pat. No. 3,391,123).

In this U.S. patent, the molecular weight of the polymer is reduced by exposing to moisture spun fibers of the polymer whose melt viscosity has been increased. It is clear from this fact that the polyester having the oxyboron compound added thereto is unstable to moisture, and the oxyboron compound is not suitable for the production of polyesters of a high degree of polymerization.

It is an object of this invention therefore to provide a process for rapidly producing substantially linear polyesters having a high degree of polymerization.

Another object of the invention is to provide a method for rapidly increasing the degree of polymerization of a polyester at atmospheric pressure or at an elevated pressure.

Still another object of the invention is to provide a composition of a substantially linear polyester of a high degree of polymerization which has superior thermal stability.

These and other objects of the invention will become apparent from the following description and the appended claims.

These objects and advantages of the invention can be achieved by a process for producing a polyester having a high degree of polymerization with an intrinsic viscosity, measured at 35° C. in o-chlorophenol, of at least 0.5, which comprises reacting at least one dicarboxylic or hydroxycarboxylic acid or its ester-forming derivative with at least one dihydric alcohol or its ester-forming derivative to form a linear polyester prepolymer having an intrinsic viscosity, measured at 35° C. in o-chlorophenol, of at least 0.2, and further polycondensing the prepolymer; wherein the polycondensation of the prepolymer is carried out in the presence of at least one organic boron compound selected from compounds of the general formula

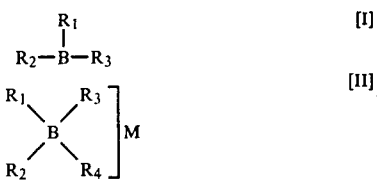

wherein $R_1$, $R_2$, $R_3$ and $R_4$ are identical or different, and each represents a member selected from the class consisting of alkyl groups having 6 to 20 carbon atoms, arylkyl groups having 6 to 20 carbon atoms and aryl groups having 6 to 20 carbon atoms, and M represents a monovalent metal.

After the addition of the organic boron compounds, the melt-polymerization reaction proceeds sufficiently fast either at atmospheric pressure or at an elevated pressure, and it is not always necessary to carry it out under reduced pressure.

The organic boron compounds used in this invention are the compounds of formula [I] or [II] in which $R_1$, $R_2$, $R_3$, and $R_4$ are identical or different, and each represent a member selected from the class consisting of alkyl groups having 6 to 20 carbon atoms, aralkyl groups having 6 to 20 carbon atoms, and aryl groups having 6 to 20 carbon atoms.

Specific examples of alkyl groups are linear alkyl groups such as n-hexyl, n-decyl and n-undecyl groups, branched alkyl groups such as 4-methylpentyl, 5-methylhexyl and 4,4-dimethylpentyl groups, and cycloalkyl groups such as cyclohexyl, 4-methylcyclohexyl and 4,4-dimethylcyclohexyl groups.

Specific examples of aralkyl groups are benzyl and phenethyl groups.

Examples of aryl groups are phenyl, substituted phenyl groups (e.g., tolyl, propylphenyl, octylphenyl, dimethylphenyl, benzylphenyl, methoxyphenyl, phenoxyphenyl and phenylphenyl groups), and unsubstituted or substituted naphthyl groups.

Examples of the monovalent metal M in general formula [II] are alkali metals such as Li, Na, K, Rb, Cs and Fr, and other monovalent metals such as Ag, Cu and Tl.

Accordingly, specific examples of the organic boron compound include tricyclohexyl boron, triphenyl boron, tribenzyl boron, trinaphthyl boron, trimesityl boron, tri-n-hexyl boron, tri(5-methylhexyl)boron, tri(4,4-dimethylpentyl) boron, tri(2,4,4-trimethyl) boron, tri(3-ethylpentyl) boron, di(cyclohexyl) mono(1,1,2-trimethylpropyl) boron, diphenyl-(1,1,2-trimethylpropyl) boron, lithium tetraphenyl boron, sodium tetraphenyl boron, potassium tetraphenyl boron, sodium tetranaphthyl boron, potassium tetranaphthyl boron, sodium tetracyclohexyl boron, and a copper [I] salt of tetraphenyl boron. These compounds can be used either singly or as mixtures.

Among these organic boron compounds, tricyclohexyl boron, tribenzyl boron, trinaphthyl boron, trimesityl boron, triphenyl boron, lithium tetraphenyl boron, sodium tetraphenyl boron, potassium tetraphenyl boron, copper tetraphenyl boron, and sodium tetracyclohexyl boron are preferred. Especially preferred are trinaphthyl boron, tricyclohexyl boron, tribenzyl boron, sodium tetraphenyl boron, sodium tetracyclohexyl boron, and copper tetraphenyl boron.

The compound of formula [I] can be prepared, for example, by a Grignard reaction between boron trifluoride etherate and an alkyl or aryl halide [J. A. C. S. 70, 2793 (1948)]. The compound of formula [II] can be prepared, for example, by reacting boron trifluoride etherate with an alkyl or aryl magnesium halide, and treating the reaction product with water and sodium chloride.

The boron compound is added to a linear polyester prepolymer having an intrinsic viscosity of at least 0.2. This linear polyester prepolymer is a polyester prepolymer composed of at least one dicarboxylic or hydroxycarboxylic acid component and at least one glycol component. The dicarboxylic or hydroxycarboxylic acid component may be those which are used conventionally to produce polyesters. The glycol component may be those which are conventionally used to produce polyesters.

Specific examples of the linear polyesters produced by the present invention include polyethylene terephthalate, polypropylene terephthalate, polybutylene terephthalate, polyhexamethylene terephthalate, polyethylene-2,6-naphthalate, polyethylene isophthalate, polyethylene adipate, polybutylene adipate, polyethylene sebacate, and polybutylene sebacate. Copolyesters containing at least 75 mole%, preferably at least 80 mole%, and especially preferably at least 85 mole%, based on the entire recurring units, of a single recurring unit may also be used. For example, copolyesters containing ethylene terephthalate as a main recurring unit, the content of another ester recurring unit such as ethylene sebacate, ethylene isophthalate, tetramethylene terephthalate, propylene terephthalate, ethylene 2,6-naphthalate or diethylene terephthalate is preferably not more than 25 mole%, more preferably not more than 20 mole%, especially preferably not more than 15 mole%.

The saturated linear polyester described above may contain copolymerized therewith a trifunctional or higher compound such as glycerol, pentaerythritol, benzenetricarboxylic acid, oxoisophthalic acid, or pyromellitic acid in an amount such that the resulting polymer is substantially linear. The amount of the polyfunctional compound is usually not more than 2.5 mole% based on the total acid component and/or the total glycol component constituting the polyester.

Any desired known method can be employed to produce the aforesaid saturated linear polyester from the acid component and the glycol component. For example, polyethylene terephthalate can be prepared by reacting terephthalic acid or its ester-forming derivative (for example, lower alkyl terephthalates such as dimethyl or diethyl terephthalate, aryl terephthalates such as phenyl terephthalate, terephthaloyl halides, or terephthalic anhydride) with ethylene glycol or its ester-forming derivative (for example, ethylene oxide, a lower fatty acid ester of ethylene glycol) under heat in the presence or absence of an esterification catalyst or an ester-interchange catalyst, and then heating the resulting glycol ester of terephthalic acid or its oligomer in the presence of a polymerization catalyst. The polymerization reaction is carried out under reduced pressure or in a stream of an inert gas. Ordinary additives may be used as desired. Examples are delusterants such as titanium oxide, stabilizers such as phosphorous acid, orthophosphoric acid, phosphonic acid, and derivatives of these (e.g., trimethyl phosphate, triphenyl phosphate, dimethyl mono-β-hydroxyethyl phosphate, monomethyl di-β-hydroxyethyl phosphate, triphenyl phosphite, tri-β-hydroxyethyl phosphate, phenylphophonic acid, and dimethyl dibenzylphosphonate), stabilizers, ultraviolet absorbers, pigments, and antistatic agents.

Preferably, known polymerization catalysts, such as compounds of lithium, sodium, potassium, calcium, barium magnesium, manganese, cobalt, germanium, antimony, lead, tin and titanium, are used preferably in an amount of 0.001 to 0.1 mole% based on the entire acid component of the polyester. Of these catalysts, antimony compounds such as antimony trioxide and antimony acetate, and titanium compounds such as titanium oxide and butyl titanate are especially preferred.

In the process of this invention, the organic boron compound is added to the linear polyester prepolymer having an intrinsic viscosity of at least 0.2 in an amount of 0.05 to 10 mole% based on the entire acid component of the polyester to promote the subsequent polymerization reaction (the reaction of increasing the intrinsic viscosity of the polymer) and to form a polyester having a low terminal carboxyl group content and a high degree of polymerization. The preferred amount of the organic boron compound is 0.05 to 8 moles%, more preferably 0.08 to 5 moles%, based on the total acid component constituting the polyester.

Addition of the organic boron compound to a linear polyester prepolymer having an intrinsic viscosity of less than 0.2 is not desirable because it does not produce sufficient effect of reducing the terminal carboxyl group content of the polyester and of promoting the polycondensation reaction.

Preferably, the organic boron compound is added when the intrinsic viscosity of the polyester is at least 0.3, especially at least 0.4. The preferred upper limit to the intrinsic viscosity at this stage is 0.8. A suitable method of adding the organic boron compound is, for example, to feed it directly into a reactor in an atmosphere of an inert gas under atmospheric pressure.

In the present invention, after the organic boron compound has been added to the linear polyester prepolymer having an intrinsic viscosity of at least 0.2, the polymerization reaction is continued until the linear polyester attains the desired degree of polymerization (the reaction of increasing the intrinsic viscosity). Usually, this reaction is carried out while the polyester is maintained in the molten state. The reaction proceeds sufficiently by heating the polymerization system at atmospheric pressure or at an elevated pressure. If desired, it may be carried out by heating under reduced pressure. Preferably, this polymerization reaction is carried out in an atmosphere of an inert gas. The reaction temperature is usually about 180° to 310° C., preferably about 200° to 300° C., and the reaction pressure is preferably 0.001 to 760 mmHg.

The work of the present inventors led to the discovery that the organic boron compound of formula [I] has an effect of increasing the thermal stability of the linear polyester. For example, when the linear polyester contains 0.001 to 5.0 parts by weight, preferably 0.01 to 5.0 parts by weight, of the organic boron compound of formula [I] per 100 parts by weight of the linear polyester, the increase of the terminal carboxyl group content or the decrease of the intrinsic viscosity of the polymer are inhibited, and the polyester has markedly improved thermal stability.

The above improvement can be achieved by simply mixing the organic boron compound of formula [I] in the aforesaid amount with the linear polyester.

If the compound of formula [I] is added to the polyester prepolymer in an excessive amount so that it remains in an amount of about 0.001 to 5.0 parts in the highly polymerized polyester (with an increased intrinsic viscosity) which is to be obtained by continuing the polycondensation after its addition, not only the degree of polymerization of the prepolymer can be increased and the increase of the terminal carboxyl group content of the polyester or the decrease of the intrinsic viscosity of the polyester can be markedly inhibited, but also the thermal stability of the polyester can be markedly improved.

When any one of the groups $R_1$, $R_2$ and $R_3$ of the boron compound of formula [I] is reacted with the polyester, the boron compound [I] also achieves the aforesaid improvement. Specifically, when a part or the apparently whole of the boron compound [I] contained in the polyester in an amount of 0.001 to 5.0 parts by weight per 100 parts by weight of the polyester is present in the form in which any one of the groups $R_1$, $R_2$ and $R_3$ is reacted with the polyester (in other words, when a part or the apparently whole of the boron compound [I] added to the polyester is reacted with the polyester, but the reaction is performed only to such an extent that it does not contribute to the increase of the intrinsic viscosity of the polyester and the boron compound is present in the polyester), the increase of the terminal carboxyl group content or the decrease of the intrinsic viscosity of the polymer can be inhibited, and the resulting polyester composition has stability to heat. Such a polyester composition is also within the scope of the invention.

It is not entirely clear by what mechanism the organic boron compound used in this invention brings about an effect of promoting the polymerization reaction and of increasing the stability of the polymer. It is theorized however that it is because the organic boron compound reacts with the terminal carboxyl groups of the polyester to form a stable linkage unit.

In the present invention, additives usually employed in the production of linear polyesters, such as fire retardants, fillers, ultraviolet absorbers, coloration inhibitors, antioxidants, heat stabilizers, pigments, fluorescent brightening agents, and slip agents can be added as desired.

The substantially linear polyester having a high degree of polymerization which is obtained by the process of this invention has an intrinsic viscosity of usually at least 0.5, preferably at least 0.6, more preferably at least 0.7, and possesses superior thermal stability. Accordingly, it is useful as melt-shapeable molding materials for the production of films and other plastic shaped articles. It finds application as photographic and packaging films, food containers such as packs and bottles, interior articles, and component parts of machines and automobiles. The following Examples illustrate the present invention in greater detail. The properties of polyester are measured by the following methods.

Intrinsic Viscosity

Calculated from the viscosity of a solution of polymer in o-chlorophenol in a concentration of 1.2 g/dl which is measured at 35° C.

Terminal Carboxyl Content

Measured by the method of A. Conix [Makromol. Chem. 26, 226 (b 1958)].

All parts in these examples are by weight.

EXAMPLE 1

(1) A reactor equipped with a rectifying column was charged with 97 parts of dimethyl terephthalate, 65 parts of ethylene glycol, 0.039 part of antimony trioxide and 0.036 part of manganese acetate tetrahydrate, and they were heated to 160° to 220° C. in an atmosphere of nitrogen. Methanol which was formed as a result of the ester-interchange reaction was distilled off. After the ester-interchange reaction was over, trimethyl phosphite was added in an amount equimolar to the manganese acetate. The reaction product was transferred to another reactor. The temperature of the inside of the reactor was raised to 265° C. over the course of about 30 minutes in a nitrogen atmosphere. Subsequently, the inside temperature was raised to 275° C. over the course of 30 minutes, and the degree of vacuum was adjusted to 0.1 to 0.3 mmHg. The reaction was carried out in this reactor in a high vacuum of 0.1 to 0.3 mmHg to afford a polyester having an intrinsic viscosity of 0.55.

The pressure of the reaction system was returned to normal atmospheric pressure using nitrogen, and 1.96 parts (1 mole% based on the terephthalic acid component) of tri-α-naphthyl boron was added, and the mixture was stirred for 30 minutes at atmospheric pressure in an atmosphere of nitrogen. The resulting polyester had an intrinsic viscosity [η] of 0.90, and a terminal carboxyl group content [COOH] of 7.0 equivalents/$10^6$ g of polymer.

(2) In order to examine the moisture resistance of the polyethylene terephthalate (having an intrinsic viscosity of 0.90) obtained in (1) above, it was pulverized to a size of 5 to 8 mesh, and dipped in water at 30° C. for 24 hours. Then, its intrinsic viscosity was measured. The results are tabulated below.

|  | Before dipping [η] | After dipping for 24 hours [η] |
| --- | --- | --- |
| Polyethylene terephthalate obtained by solid phase polymerization | 0.90 | 0.84 |
| Polyethylene terephthalate obtained in Example 1, (1) | 0.90 | 0.83 |

COMPARATIVE EXAMPLE 1

A polyester having an intrinsic viscosity of 0.55 was prepared in the same way as in Example 1. Then, without adding tri-α-naphthyl boron, the polyester was stirred for 30 minutes under atmospheric pressure in an atmosphere of nitrogen. The resulting polyester had an intrinsic viscosity of 0.53, and a terminal carboxyl group content of 14.0 equivalents/$10^6$ g of polymer.

COMPARATIVE EXAMPLE 2

In Example 1, the degree of vacuum was adjusted to 5 to 10 mmHg and the reaction was performed for 30 minutes to afford a polyester having an intrinsic viscosity of 0.15. In the same way as in Example 1, tri-α-naphthyl boron was added. The resulting polyester had an intrinsic viscosity of 0.25, and a terminal carboxyl group content of 65 equivalents/$10^6$ g of polymer.

EXAMPLE 2

In the same way as in Example 1, a polyester having an intrinsic viscosity of 0.55 was prepared, and then 1.30 parts (1 mole% based on the terephthalic acid component) of tricyclohexyl boron was added. The mixture was stirred for 30 minutes at atmospheric pressure in a nitrogen atmosphere. The resulting polyester had an intrinsic viscosity of 0.87, and a terminal carboxyl group content of 7.5 equivalents/$10^6$ g of polymer.

EXAMPLE 3

In the same way as in Example 1, a polyester having an intrinsic viscosity of 0.55 was prepared, and then 1.42 parts (1 mole% based on the terephthalic acid component) of tribenzyl boron was added. The mixture was stirred for 30 minutes at atmospheric pressure in a nitrogen atmosphere. The resulting polyester had an intrinsic viscosity of 0.85 and a terminal carboxyl group content of 8.0 equivalents/$10^6$ g of polymer.

EXAMPLE 4

A reactor fitted with a rectifying column was charged with 97 parts of dimethyl terephthalate, 65 parts of ethylene glycol, 0.039 part of antimony trioxide and 0.036 part of manganese acetate tetrahydrate, and they were heated to 160° to 220° C. in a nitrogen atmosphere. Methanol which was generated as a result of ester-interchange reaction was distilled off. After the ester-interchange reaction was over, trimethyl phosphite was added in an amount equimolar to the manganese acetate. The reaction product was transferred to another reactor. The temperature of the inside of the reactor was raised to 265° C. over the course of about 30 minutes, and subsequently, the inside temperature was raised to 275° C. over the course of 30 minutes. The degree of vacuum was adjusted to 0.1 to 0.3 mmHg, and the reaction was performed for 60 minutes in this reactor in a high vacuum of 0.1 to 0.3 mmHg. Thus, a polyester having an intrinsic viscosity of 0.55 was obtained.

The pressure of the reaction system was returned to normal atmospheric pressure using nitrogen, and 1.71 parts (1 mole% based on the terephthalic acid component) of sodium tetraphenyl boron was added. The mixture was stirred for 30 minutes at atmospheric pressure. The resulting polyester had an intrinsic viscosity of 0.94, and a terminal carboxyl group content of 7.0 equivalents/$10^6$ g of polymer.

COMPARATIVE EXAMPLE 3

In Example 1, the degree of vacuum was adjusted to 5 to 10 mmHg, and the reaction was performed for 30 minutes to afford a polyester having an intrinsic viscosity of 0.15. In the same way as in Example 1, sodium tetraphenyl boron was added. The resulting polyester had an intrinsic viscosity of 0.25, and a terminal carboxyl group content of 65 equivalents/$10^6$ g of polymer.

EXAMPLE 5

In the same way as in Example 4, polyethylene terephthalate having an intrinsic viscosity of 0.55 was prepared, and 1.91 parts (1 mole% based on the terephthalic acid component) of tetraphenyl boron, copper (I) salt [$CuB(C_6H_5)_4$] was added instead of the sodium tetraphenyl boron used in Example 1. Subsequently, the same procedure as in Example 1 was performed. The resulting polyester had an intrinsic viscosity of 0.90, and a terminal carboxyl group content of 8.0 equivalents/$10^6$ g of polymer.

EXAMPLE 6

By the same method as in Example 4, polyethylene terephthalate having an intrinsic viscosity of 0.55 was obtained, and 1.83 parts (1 mole% based on the terephthalic acid component) of sodium tetracyclohexyl boron [$NaB(C_6H_{11})_4$] was added instead of the sodium tetraphenyl boron used in Example 1. Subsequently, the same procedure as in Example 1 was taken. The resulting polyester had an intrinsic viscosity of 0.92 and a terminal carboxyl group content of 7.5 equivalents/$10^6$ g of polymer.

EXAMPLES 7 TO 9

Tri-α-naphthyl boron in varying amounts was added to polyethylene terephthalate having an intrinsic viscosity of 0.55 obtained in the same way as in Example 1. The results are shown in Table 1.

Table 1

| Example | Amount of tri-α-naphthyl boron (mole %) | Reaction time after the addition of the boron compound (minutes) | Intrinsic viscosity [η] | Terminal carboxyl group content (eq./$10^6$g of polymer) |
|---|---|---|---|---|
| 7 | 0.1 | 10 | 0.70 | 9.0 |
| 8 | 0.5 | 10 | 0.80 | 8.5 |
| 9 | 2.0 | 30 | 0.65 | 9.5 |

EXAMPLE 10

A reactor equipped with a rectifying column was charged with 104 parts of dimethyl adipate, 78 parts of ethylene glycol, and 0.061 part of tetra-n-butyl titanate, and they were heated to 160° to 220° C. in an atmosphere of nitrogen. Methanol which was generated as a result of the ester-interchange reaction was distilled off. After the ester-interchange reaction was over, the reaction product was transferred to another reactor. The temperature of the inside of the reactor was raised to 240° C. over the course of about 30 minutes in a nitrogen atmosphere, and the degree of vacuum was adjusted to 0.1 to 3.0 mmHg. The reaction was performed for 120 minutes in a high vacuum of 0.1 to 0.3 mmHg to afford a polyester having an intrinsic viscosity of 0.67.

The pressure of the reaction system was returned to normal atmospheric pressure by using nitrogen, and 2.35 parts of tri-α-naphthyl boron was added. The mixture was stirred for 30 minutes at atmospheric pressure in a nitrogen atmosphere. The resulting polyester had an intrinsic viscosity of 1.09, and a terminal carboxyl group content of 17 equivalents/$10^6$ g of polymer.

The following Examples 11 to 13 are intended to show the heat stabilizing effect of the boron compound of formula [I] used in this invention. In these examples, the rotating speed of the screw of the extruder, the residence time of the polymer, and other conditions were varied so that the intrinsic viscosity of the polymer did not increase in the extruder, and that its intrinsic viscosity became about the same as that of a blank for comparison with the case of not adding the organic boron compound.

EXAMPLE 11

Five parts of tri-α-naphthyl boron was added to 1,000 parts of polyethylene terephthalate having an intrinsic viscosity of 0.65. The mixture was melt-kneaded by an extruder having a screw diameter of 30 mm to form polyester chips having an intrinsic viscosity of 0.599.

The chips were screened to adjust their particle size to 5 to 8 mesh, and exposed to air at 180° C. for long periods of time. The stability of the polymer was measured.

The results are shown in Table 2.

EXAMPLE 12

Five parts of tricyclohexyl boron was added to 1000 parts of polyethylene terephthalate having an intrinsic viscosity of 0.65, and the mixture was melt-kneaded by an extruder having a screw diameter of 30 mm to afford polyester chips having an intrinsic viscosity of 0.590.

The chips were screened to adjust their particle size to 5 to 8 mesh, and then exposed to air at 180° C. for long periods of time. The stability of the chips was measured.

The results are shown in Table 2.

EXAMPLE 13

Five parts of tribenzyl boron was added to 1000 parts of polyethylene terephthalate having an intrinsic viscosity of 0.65, and the mixture was melt-kneaded by an extruder having a screw diameter of 30 mm to afford polyester chips having an intrinsic viscosity of 0.589.

The chips were screened to adjust their particle size to 5 to 8 mesh, and exposed to air at 180° C. for long periods of time. The stability of the chips was measured.

The results are shown in Table 2.

COMPARATIVE EXAMPLE 4

One thousand (1000) parts of polyethylene terephthalate having an intrinsic viscosity of 0.65 alone was melted by an extruder having a screw diameter of 30 mm to afford polyester chips having an intrinsic viscosity of 0.585.

The chips were screened to adjust their particle diameter of 5 to 8 mesh, and exposed to air at 180° C. for long periods of time. The stability of the chips was measured.

The results are shown in Table 2.

Table 2

| | | | Change with time | | | |
|---|---|---|---|---|---|---|
| | | | Before | Time after exposure | | |
| Example | Organic boron compound | Properties | exposure | 3 days | 7 days | 14 days |
| 11 | Tri-α-naphthyl boron | [η] | 0.599 | 0.553 | 0.521 | 0.555 |
| | | [COOH] | 42 | 46 | 57 | 68 |
| 12 | Tricyclohexyl boron | [η] | 0.590 | 0.526 | 0.502 | 0.518 |
| | | [COOH] | 43 | 47 | 67 | 70 |
| 13 | Tribenzyl boron | [η] | 0.589 | 0.530 | 0.510 | 0.509 |
| | | [COOH] | 43 | 47 | 62 | 71 |
| Comparative Example 4 | Not added | [η] | 0.585 | 0.472 | 0.384 | 0.347 |
| | | [COOH] | 43 | 95 | 191 | 224 |

EXAMPLE 14 AND COMPARATIVE EXAMPLE 5

These examples are to illustrate the increase of [η] and the thermal stability of polymer in an extruder.

1000 Parts of polyethylene terephthalate having an intrinsic viscosity [η] of 0.65 was mixed with 15 parts of tri-α-naphthyl boron, and melt-kneaded in an extruder having a screw diameter of 50 mm to form a polymer having an intrinsic viscosity [η] of 0.75.

Polyethylene terephthalate having an intrinsic viscosity of 0.75 was pulverized into chips with a size of 5 to 8 mesh. The chips were exposed to the air at 180° C. for a long period of time, and the changes of [η] with time were measured. The results are shown in Table 3. For comparison, chips of polyethylene terephthalate having an intrinsic viscosity of 0.75 which was obtained by an ordinary polymerization method and did not contain an organic boron compound were subjected to the same heat stability test as described above. The results are also shown in Table 3.

Table 3

| | Sample for the heat stability test | Periodic changes in [η] | | | |
|---|---|---|---|---|---|
| | | Before exposure | 3 days | 7 days | 14 days |
| Comparative Example 5 | Polyethylene terephthalate | 0.75 | 0.605 | 0.470 | 0.443 |
| Example 14 | Polyethylene terephthalate containing 1.5% by weight of tri-α-naphthyl boron | 0.75 | 0.689 | 0.654 | 0.678 |

When polyethylene terephthalate was melt-kneaded in the same extruder as above in the same way as in Example 14 except that tri-α-naphthyl boron was not added, the intrinsic viscosity of the polyethylene terephthalate became 0.59.

What we claim is:

1. A process for producing a polyester having a high degree of polymerization with an intrinsic viscosity, measured at 35° C. in o-chlorophenol, of at least 0.5, which comprises melt polymerizing at least one dicarboxylic or hydroxycarboxylic acid or its ester-forming derivative with at least one dihydric alcohol or its ester-forming derivative to form a linear polyester prepolymer having an intrinsic viscosity, measured at 35° C. in o-chlorophenol, of at least 0.2, and further polycondensing the prepolymer; wherein the polycondensation of the prepolymer is carried out in the presence of at least one organic boron compound selected from compounds of the general formula

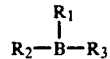

wherein $R_1$, $R_2$ and $R_3$ are identical or different, and each represents an alkyl group having 6 to 20 carbon atoms, an aralkyl group having 6 to 20 carbon atoms, or an aryl group having 6 to 20 carbon atoms, and compounds of the general formula

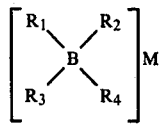

wherein $R_1$, $R_2$, $R_3$ and $R_4$ are identical or different, and each represent an alkyl group having 6 to 20 carbon atoms, an aralkyl group having 6 to 20 carbon atoms, or an aryl group having 6 to 20 carbon atoms, M represent a monovalent metal.

2. The process of claim 1 wherein the amount of the organic boron compound is 0.05 to 10 mole% based on the dicarboxylic or hydroxycarboxylic acid or its ester-forming derivative constituting the polyester.

3. The process of claim 1 wherein the organic boron compound is selected from the group consisting of tricyclohexyl boron, tribenzyl boron, trinaphthyl boron, trimesityl boron, triphenyl boron, lithium tetraphenyl boron, sodium tetraphenyl boron, potassium tetraphenyl boron, copper tetraphenyl boron, sodium tetrabenzyl boron, and sodium tetracyclohexyl boron.

4. The process of claim 1 wherein the polycondensation of the prepolymer is carried out by heating it in the molten state at atmospheric pressure or at an elevated pressure.

5. A polyester composition stabilized against oxidation at high temperatures, said composition comprising (1) 100 parts by weight of a linear polyester having an intrinsic viscosity, measured at 35° C. in o-chlorophenol, of at least 0.5, said polyester being prepared by melt polymerizing of at least one dicarboxylic or hydroxycarboxylic acid or its ester-forming derivative with at least one dihydric alcohol or its ester-forming derivative, and (2) 0.001 to 5.0 parts by weight of an organic boron compound of the following formula

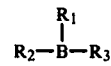

wherein $R_1$, $R_2$ and $R_3$ are identical or different, and each represents an alkyl group having 6 to 20 carbon atoms, an aralkyl group having 6 to 20 carbon atoms, or an aryl group having 6 to 20 carbon atoms.

* * * * *